United States Patent
Nagakura et al.

(10) Patent No.: US 9,887,877 B2
(45) Date of Patent: Feb. 6, 2018

(54) SWITCH APPARATUS, VLAN SETTING MANAGEMENT METHOD AND PROGRAM

(71) Applicant: NEC Corporation, Tokyo (JP)

(72) Inventors: Shohei Nagakura, Tokyo (JP); Yoji Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 181 days.

(21) Appl. No.: 14/442,684

(22) PCT Filed: Nov. 27, 2013

(86) PCT No.: PCT/JP2013/081887
§ 371 (c)(1),
(2) Date: May 13, 2015

(87) PCT Pub. No.: WO2014/084250
PCT Pub. Date: Jun. 5, 2014

(65) Prior Publication Data
US 2016/0285682 A1    Sep. 29, 2016

(30) Foreign Application Priority Data

Nov. 28, 2012  (JP) ................. 2012-260051

(51) Int. Cl.
*H04L 12/24* (2006.01)
*H04L 12/46* (2006.01)
*H04L 12/741* (2013.01)

(52) U.S. Cl.
CPC ...... *H04L 41/0806* (2013.01); *H04L 12/4641* (2013.01); *H04L 12/4675* (2013.01); *H04L 45/745* (2013.01)

(58) Field of Classification Search
CPC ............ H04L 12/4641; H04L 12/4645; H04L 12/467; H04L 12/56; H04L 12/465;
(Continued)

(56) References Cited

U.S. PATENT DOCUMENTS 6,775,290 B1 *  8/2004  Merchant ............ H04L 12/4645
                                                    370/395.31
7,406,076 B2 *  7/2008  Katoh .................. H04L 12/1886
                                                    370/390
(Continued)

FOREIGN PATENT DOCUMENTS

CN    102111318 A    6/2011
CN    102334310 A    1/2012
(Continued)

OTHER PUBLICATIONS

Russian Decision to Grant a Patent dated Aug. 8, 2016 with a partial English translation thereof.
(Continued)

*Primary Examiner* — Alina N Boutah
(74) *Attorney, Agent, or Firm* — McGinn IP Law Group, PLLC.

(57) ABSTRACT

A switch apparatus includes: a plurality of ports; a VLAN setting management unit that sets VLAN information in the plurality of ports and manages the VLAN information set in the plurality of ports; and a VLAN setting unit that, when VLAN information to be added to an output packet specified in control information received from a predetermined control apparatus is not set in an output port for the output packet, instructs the VLAN setting management unit to set VLAN information specified in the control information in a corresponding output port.

14 Claims, 8 Drawing Sheets

(58) Field of Classification Search
CPC ............. H04L 12/4666; H04L 43/026; H04L 41/0806; H04L 45/00; H04L 45/02; H04L 45/60; H04L 45/7457; H04L 45/38; H04L 45/70; H04L 49/3027; H04L 49/351; H04L 49/354; H04L 49/35; H04L 63/0272; H04L 47/10
USPC .......... 370/252, 395.53, 400, 389, 230, 235, 370/392, 254, 352, 395.31, 395.52, 404, 370/401; 709/220
See application file for complete search history.

(56) References Cited

U.S. PATENT DOCUMENTS

| | | | | |
|---|---|---|---|---|
| 8,040,901 | B1* | 10/2011 | Kompella | H04L 12/437 370/395.71 |
| 8,750,164 | B2* | 6/2014 | Casado | H04L 12/4633 370/254 |
| 8,942,139 | B2* | 1/2015 | Eisenhauer | H04L 41/0806 370/255 |
| 2006/0227777 | A1* | 10/2006 | Shimizu | H04L 12/4641 370/389 |
| 2006/0248229 | A1 | 11/2006 | Saunderson et al. | |
| 2008/0031260 | A1* | 2/2008 | Polland | H04L 12/4645 370/395.53 |
| 2008/0049778 | A1* | 2/2008 | Yano | H04L 45/245 370/422 |
| 2008/0165705 | A1* | 7/2008 | Umayabashi | H04L 45/48 370/256 |
| 2008/0205296 | A1 | 8/2008 | Zhang et al. | |
| 2009/0300178 | A1 | 12/2009 | Saunderson et al. | |
| 2010/0135307 | A1* | 6/2010 | Nakagawa | H04L 49/354 370/395.53 |
| 2011/0231574 | A1 | 9/2011 | Saunderson et al. | |
| 2011/0261825 | A1 | 10/2011 | Ichino | |
| 2011/0299424 | A1 | 12/2011 | Rikitake et al. | |
| 2012/0127854 | A1 | 5/2012 | Khetan et al. | |
| 2012/0151057 | A1 | 6/2012 | Paredes et al. | |
| 2012/0155467 | A1 | 6/2012 | Appenzeller | |
| 2012/0254440 | A1 | 10/2012 | Wang | |
| 2012/0294192 | A1 | 11/2012 | Masood et al. | |
| 2013/0003745 | A1* | 1/2013 | Nishimura | H04L 12/4641 370/400 |
| 2013/0058229 | A1* | 3/2013 | Casado | H04L 45/745 370/252 |
| 2013/0144995 | A1* | 6/2013 | Ishii | H04L 12/4645 709/220 |
| 2013/0148667 | A1 | 6/2013 | Hama et al. | |
| 2013/0176888 | A1* | 7/2013 | Kubota | H04L 45/38 370/252 |
| 2014/0016647 | A1* | 1/2014 | Yoshida | H04L 12/4666 370/395.53 |
| 2014/0119239 | A1* | 5/2014 | Hu | H04L 12/4641 370/256 |
| 2014/0241368 | A1* | 8/2014 | Suzuki | H04L 45/74 370/392 |
| 2014/0247725 | A1* | 9/2014 | Torigoe | H04L 12/2874 370/235 |
| 2015/0172077 | A1* | 6/2015 | Yoshida | H04L 49/25 370/401 |
| 2015/0256457 | A1* | 9/2015 | Takashima | H04L 12/4625 370/392 |
| 2015/0326477 | A1* | 11/2015 | Fujita | H04L 45/54 370/392 |

FOREIGN PATENT DOCUMENTS

| | | |
|---|---|---|
| CN | 102685006 A | 9/2012 |
| CN | 102790792 A | 11/2012 |
| EP | 2 393 249 A1 | 12/2011 |
| EP | 2547043 A1 | 1/2013 |
| GB | 2 425 681 A | 11/2006 |
| JP | 2002-064525 A | 2/2002 |
| RU | 2 394 383 C2 | 7/2010 |
| WO | WO 2008/114424 A1 | 9/2008 |
| WO | WO 2012/023604 A1 | 2/2012 |
| WO | WO 2012/082988 A1 | 6/2012 |
| WO | WO 2012/133060 A1 | 10/2012 |

OTHER PUBLICATIONS

Ben Pfaff et al, "Open Flow Switch Specification" [on-line], Feb. 28, 2011, [retrieved as of Jul. 21, 2016], Internet, "URL: http: archive. Openflow.org documents openflow-spec-v1.1.0.pdf".
European Search Report dated Mar. 30, 2016.
International Search Report (ISR) (PCT Form PCT/ISA/210), in PCT/JP2013/081887, dated Feb. 25, 2014.
Nick McKeown, et. al. "OpenFlow: Enabling Innovation in Campus Networks," [online], [searched on May 31st, 2012], the Internet <URL: http://www.openflow.org/documents/openflow-wp-latest.pdf>.
"OpenFlow Switch Specification" Version 1.1.0 Implemented (Wire Protocol 0x02), [online], [searched on May 31, 2012], the Internet <URL:http://www.openflow.org/documents/openflow-spec-v1.1.0.pdf.
Chinese Office Action, dated May 15, 2017, in Chinese Application No. 201380062200.3 and English Translation thereof.

* cited by examiner

FIG. 3

| VLAN ID | PORT |
|---|---|
| 10 | 0/1, 0/2 |
| 20 | 0/3 |

US 9,887,877 B2

SWITCH APPARATUS, VLAN SETTING MANAGEMENT METHOD AND PROGRAM

REFERENCE TO RELATED APPLICATION

This application is based upon and claims the benefit of the priority of Japanese Patent Application No. 2012-260051 filed on Nov. 28, 2012, the disclosure of which is incorporated herein in its entirety by reference thereto.

The present invention relates to a switch apparatus, a VLAN (Virtual Local Area Network) setting management method, and a program, and particularly to a switch apparatus centrally controlled by a control apparatus, and a VLAN setting management method and a program therefor.

BACKGROUND

Technical Field

In recent years, a technology called OpenFlow has been proposed (refer to Non Patent Literatures 1 and 2). OpenFlow treats communication as an end-to-end flow and performs path control, failure recovery, load balancing, and optimization for each flow. An OpenFlow switch, specified in Non Patent Literature 2, comprises a secure channel for communicating with an OpenFlow controller and operates according to a flow table suitably appended or rewritten by the OpenFlow controller. In the flow table, a set of matching conditions (Match Fields) matching a packet header, flow statistics (Counters), and Instructions defining the processing contents is defined for each flow (refer to the section of "4.1 Flow Table" in Non Patent Literature 2).

For instance, upon receiving a packet, the OpenFlow switch searches for an entry having a matching condition (refer to "4.3 Match Fields" in Non Patent Literature 2) that matches the header information of the received packet in the flow table. When an entry matching the received packet is found as a result of the search, the OpenFlow switch updates the flow statistics (Counters) and performs the processing content (packet transmission from a designated port, flooding, discard, etc.) written in the instruction field of the entry on the received packet. On the other hand, when no entry matching the received packet is found as a result of the search, the OpenFlow switch requests the OpenFlow controller to set the entry via the secure channel, transmitting a request (Packet-In message) to determine the contents of the processing performed on the received packet. The OpenFlow switch receives a flow entry that defines the processing contents and updates the flow table. As described, the OpenFlow switch forwards packets using entries stored in the flow table as processing rules.

Patent Literature 1 discloses a technology that automates setting in a port-based VLAN. More concretely, when being notified of terminal information by a switching hub, this network management apparatus returns a VLAN ID corresponding to the terminal information as a response to the switching hub. Patent Literature 1 states that the switching hub then sets a virtual LAN designated by the VLAN ID in the port on which the connection of the terminal is detected.

Patent Literature 2 discloses a technology that automates the allocation of VLAN numbers to router ports in a relay apparatus that comprises virtual ports, which are the router ports for routing packets between VLANs.

Patent Literature 1

Japanese Patent Kokai Publication No. JP2002-64525A

Patent Literature 2

International Publication Number WO2008/114424

Non Patent Literature 1

Nick McKeown, et. al. "OpenFlow: Enabling Innovation in Campus Networks," [online], [searched on May 31, 2012]

Non Patent Literature 2

"OpenFlow Switch Specification" Version 1.1.0 Implemented (Wire Protocol 0x02), [online], [searched on May 31, 2012]

SUMMARY

The following analysis is given by the present invention. A VLAN ID (Virtual Local Area Network Identifier) is sometimes assigned to each port of a switch apparatus, represented by the OpenFlow switch described above. By doing this, when a packet is outputted, a packet with a VLAN ID that does not match the VLAN ID of the output port can be effectively discarded.

However, in order to perform the VLAN assignment described above, a network administrator must manually create VLAN IDs via a command line interface (CLI), and assign them to the interface.

Particularly, in a centrally controlled network such as the ones in Non Patent Literatures 1 and 2, control information (flow entries) set by a control apparatus sometimes instructs adding a VLAN that is not set in the switch. As a result, a VLAN ID must be set to the applicable port, and if VLAN IDs are not set appropriately in a timely manner, packets may continue to be discarded meantime.

Therefore, there is a need in the art to provide a switch apparatus, VLAN setting management method, and program capable of contributing to the reduction of the load involved in setting a VLAN ID or to the reduction of the packet loss period due to setting delay in a centrally controlled network.

According to a first aspect, there is provided a switch apparatus comprising a plurality of ports. The switch apparatus comprises a VLAN setting management unit that sets VLAN information in the plurality of ports and manages the VLAN information set in the plurality of ports. Further, the switch apparatus comprises a VLAN setting unit that, when VLAN information to be added to an output packet specified in control information received from a predetermined control apparatus is not set in an output port for the output packet, instructs the VLAN setting management unit to set VLAN information specified in the control information in a corresponding output port. In other words, the switch apparatus comprises a function of learning VLAN setting based on the control information transmitted by the control apparatus.

According to a second aspect, there is provided a VLAN setting method for a switch apparatus comprising a plurality of ports. The VLAN setting method comprises, by the switch apparatus, confirming whether or not VLAN information to be added to an output packet specified in control information received from a predetermined control apparatus is set in an output port specified in the control information. Further, the VLAN setting method comprises setting in the output port the VLAN information to be added to the output packet specified in the control information received from the predetermined control apparatus when the VLAN information to be added to the output packet specified in the control information is not set in the output port. This method is tied to a particular machine, which is a switch apparatus that processes a packet on the basis of control information received from a control apparatus.

According to a third aspect, there is provided a program for a computer, arranged in a switch apparatus that comprises a plurality of ports. The program causes the computer to execute confirming whether or not VLAN information to be added to an output packet specified in control information received from a predetermined control apparatus is set in an output port specified in the control information. Further, the program causes the computer to execute setting in the output port the VLAN information to be added to the output packet specified in the control information received from the predetermined control apparatus when the VLAN information to be added to the output packet specified in the control information is not set in the output port. Note that this program can be stored in a computer-readable (non-transient) storage medium. In other words, the present invention can be realized as a computer program product.

The present invention provides the following advantages, but not restricted thereto. According to the present invention, the load involved in setting a VLAN ID can be reduced in a centrally controlled network. Further, the packet loss time due to delay in setting a VLAN ID can be reduced.

BRIEF DESCRIPTION OF DRAWINGS

FIG. 3 is a drawing showing an example of a table held in a VLAN setting management unit of the switch apparatus of the first exemplary embodiment of the present invention.

PREFERRED MODES

Figure 1:
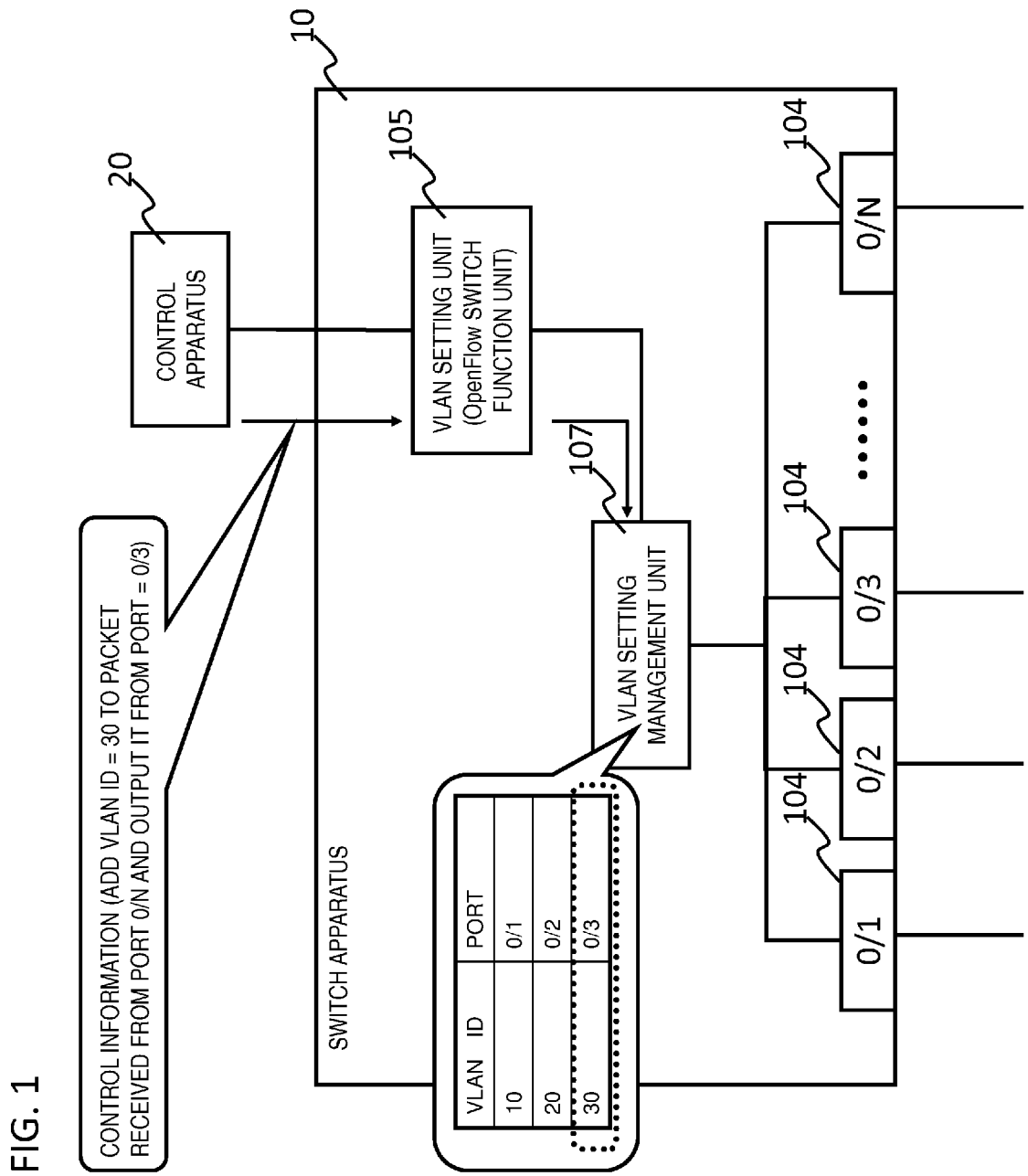
FIG. 1 is a drawing showing a configuration of an exemplary embodiment of the present invention.

In the present disclosure, there are various possible modes, which include the following, but not restricted thereto. First, a summary of an exemplary embodiment of the present invention will be given with reference to the drawings. Note that drawing reference signs in the summary are given to each element as an example solely to facilitate understanding for convenience and are not intended to limit the present invention to the modes shown in the drawings.

In an exemplary embodiment, the present invention can be realized by a switch apparatus 10 controlled by a control apparatus 20, as shown in FIG. 1. The switch apparatus 10 comprises a plurality (N number) of ports 104, a VLAN (Virtual Local Area Network) setting management unit 107 that sets VLAN information for each of the ports 104 and manages the VLAN information set in each of the ports; and a VLAN setting unit 105 that instructs the VLAN setting management unit 107 to set VLAN information specified by control information received from the control apparatus 20 for a corresponding output port when VLAN information to be added to an output packet specified by the control information has not been set in the output port for the output packet.

For instance, when receiving control information from the control apparatus 20 indicating that a packet received from a port 0/N is outputted from a port 0/3 with a VLAN ID of 30 added thereto, the VLAN setting unit 105 confirms whether or not "VLAN ID=30" is set in the port 0/3 by referring to the contents (for instance the table in the balloon in FIG. 1) managed by the VLAN setting management unit 107. For instance, if only information that "VLAN ID=10" is set in a port 0/1 and "VLAN ID=20" is set in a port 0/2 can be obtained, the VLAN setting unit 105 instructs the VLAN setting management unit 107 to set "VLAN ID=30" in the port 0/3. The VLAN setting management unit 107 set the VLAN information for the corresponding port according to the instruction (for instance "VLAN ID=30 in the port 0/3 of FIG. 1).

By using the switch apparatus 10, it becomes possible to automatically set the same VLAN ID as a VLAN ID added to an output packet for an output port without manual setting. Further, in the example in FIG. 1, a VLAN ID is automatically registered using the control information that instructs outputting after a VLAN ID has been added to a received packet, however, a VLAN ID specified by control information may similarly be automatically set in a corresponding output port in a case where a matching condition in the control information has a VLAN ID and the control information that instructs a packet matching the matching condition to be outputted from a specified port is received, or a case where an instruction to output a packet for which a VLAN ID has been set is received.

(First Exemplary Embodiment)

Figure 2:
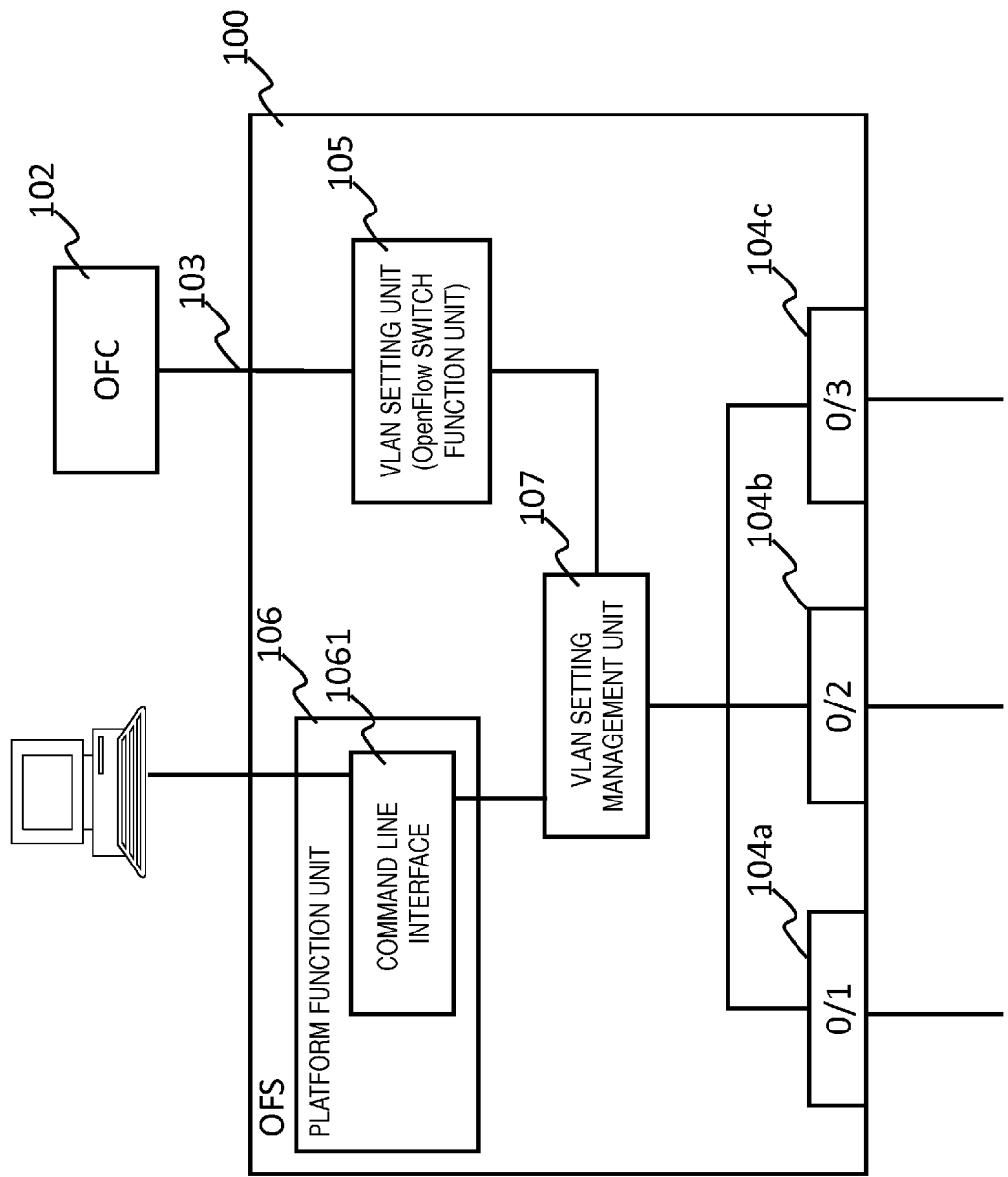
FIG. 2 is a drawing showing a configuration of a switch apparatus of a first exemplary embodiment of the present invention.

Next, a first exemplary embodiment of the present invention will be described in detail with reference to the drawings. FIG. 2 is a drawing showing a configuration of a switch apparatus of the first exemplary embodiment of the present invention. FIG. 2 shows an OpenFlow switch ("OFS" hereinafter) 100 connected to an OpenFlow controller ("OFC" hereinafter) 102. Further, the OFS 100 and the OFC 102 are connected by a secure channel 103 in FIG. 2.

In the example in FIG. 2, the OFS 100 comprises three ports 104a to 104c, the VLAN setting unit 105, a platform function unit 106 that comprises a command line interface ("CLI" hereinafter) 1061, and the VLAN setting management unit 107.

Each of the ports 104a to 104c is connected to an OFS and a host apparatus, and receives/outputs packets that the OFS 100 exchanges with these apparatuses. Further, "0/1," "0/2," and "0/3" shown in FIG. 2 denote slot numbers and port numbers. For instance, the port 104a can be expressed "0/1" meaning slot #0/port #1.

The VLAN setting unit 105 functions as an OpenFlow switch function unit that processes packets forwarded by the VLAN setting management unit 107 by referring to a flow table held internally therein as the OpenFlow switches of Non Patent Literatures 1 and 2.

Further, when receiving a control message from the OFC 102 (for instance a FlowMod message or PacketOut message in Non Patent Literature 2), the VLAN setting unit 105 confirms whether or not the contents thereof include an association between a VLAN ID and an output port. When the control message includes an association between an VLAN ID and an output port, the VLAN setting unit 105 adds an entry that associates the VLAN ID with the output port to the table held by the VLAN setting management unit 107, or adds the output port to an existing entry of the corresponding VLAN ID.

The platform function unit 106 is used when the table is updated in the VLAN setting management unit 107 via the CLI 1061.

Figure 3:
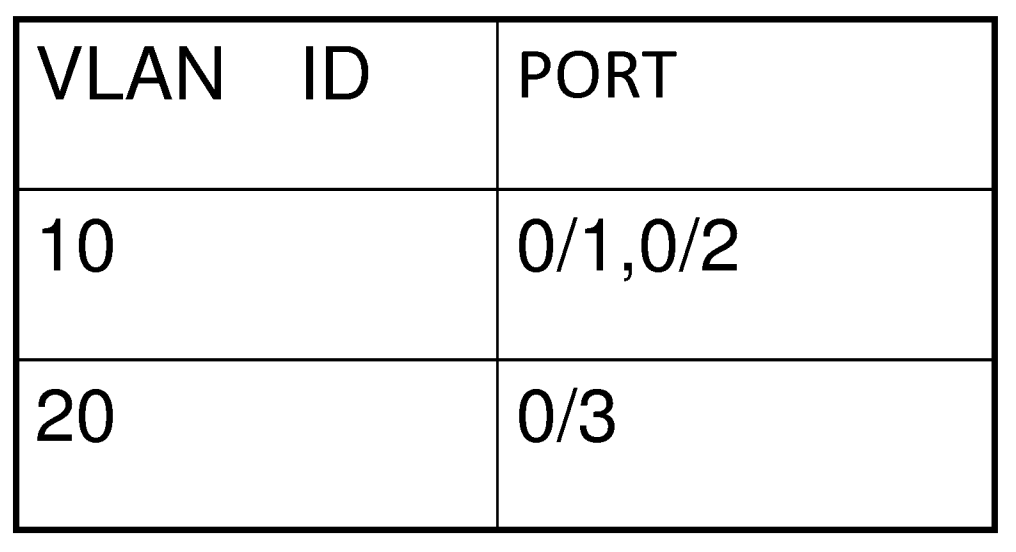

The VLAN setting management unit 107 is constituted by including a table that manages an association between a VLAN ID and each port, and sets a VLAN ID for each port according to an entry in the table. FIG. 3 is an example of the table that the VLAN setting management unit 107 uses to manage associations between VLAN IDs and ports. In the example in FIG. 3, the ports 104a (0/1) and 104b (0/2) in FIG. 2 are assigned to "VLAN ID=10," and the port 104c (0/3) in FIG. 2 is assigned to "VLAN ID=20." Further, the associations between the VLAN IDs and the ports shown in FIG. 3 may be entered by an operator via the CLI 1061 of the platform function unit 106 or may be automatically set by the process described below.

Further, each unit (processing means) of the switch apparatus and the OFS shown in FIGS. 1 and 2 can be realized by a computer program having a computer that constitutes these apparatuses execute each processing described above using the hardware thereof.

Figure 4:
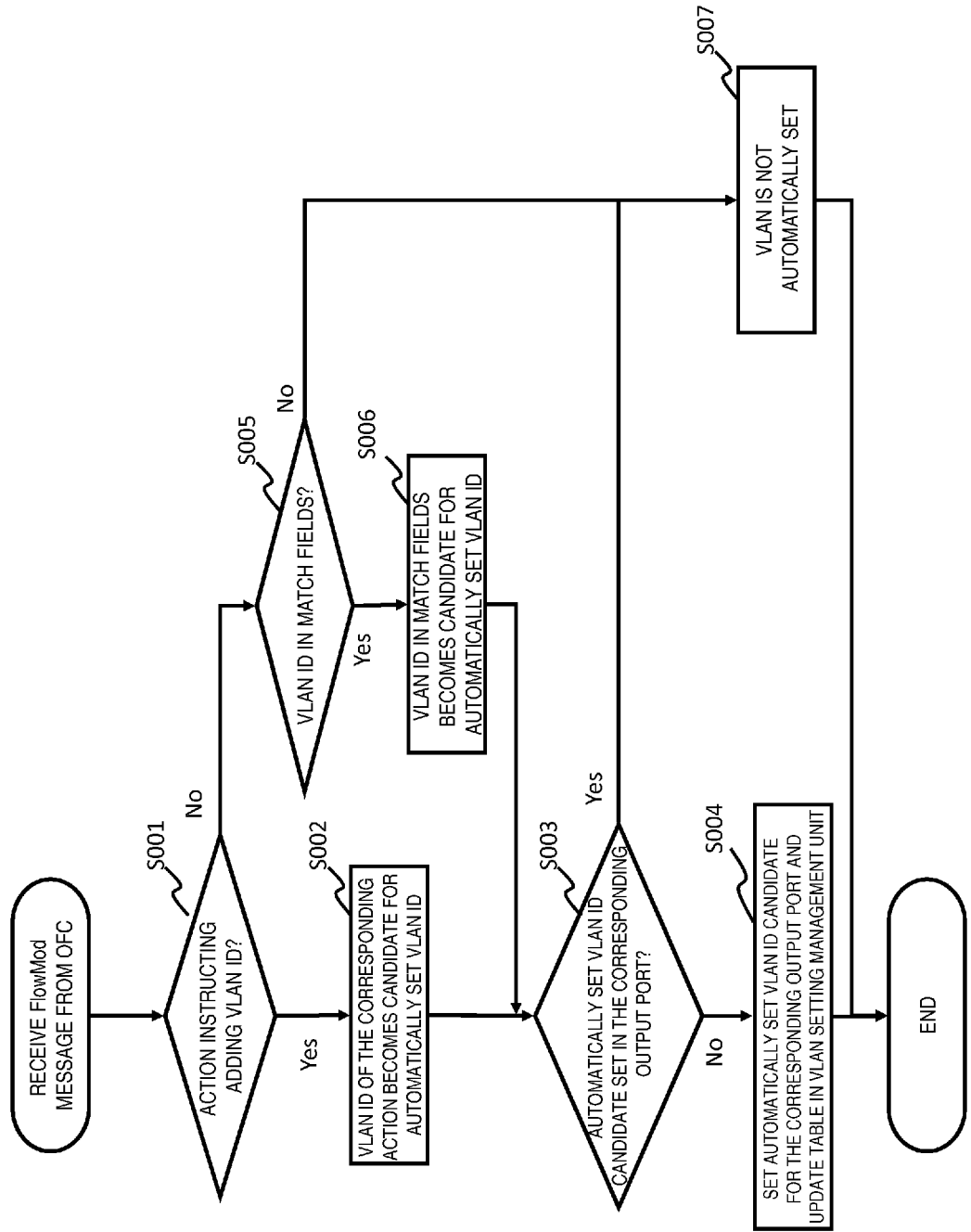
FIG. 4 is a flowchart showing an operation of the switch apparatus of the first exemplary embodiment of the present invention.

Next, an operation of the present exemplary embodiment will be described in detail with reference to the drawings. FIG. 4 is a flowchart showing an operation of the OFS 100 of the present exemplary embodiment when it receives from the OFC 102 a FlowMod message as a control message instructing adding an entry to the flow table or updating an entry therein. In FIG. 4, the OFS 100 first refers to the instructions field of the entry that is the target of addition or updating by the FlowMod message and confirms whether or not an action that instructs adding a VLAN ID is set (step S001).

As a result of the confirmation, when an action that instructs adding an VLAN ID is found to be set ("Yes" in the step S001), the OFS 100 makes the VLAN ID instructed to be added in the corresponding action a candidate for an automatically set VLAN ID (step S002).

When no action that instructs adding a VLAN ID is found to be set ("No" in the step S001) as a result of the confirmation in the step S001, the OFS 100 refers to the match fields of the entry that is the target of addition or updating by the FlowMod message to confirm whether or not a VLAN ID is specified (step S005).

When a VLAN ID is found to be specified in the match fields as a result of the confirmation ("Yes" in the step S005), the OFS 100 makes the VLAN ID specified in the match fields a candidate for an automatically set VLAN ID (step S006).

Once the automatically set VLAN ID candidate is determined, the OFS 100 confirms whether or not the VLAN setting management unit 107 holds an entry corresponding to a set of the automatically set VLAN ID candidate and the output port specified by the entry that is the target of addition or updating by the FlowMod message (step S003). When such an entry exists ("Yes" in the step S003), VLAN automatic setting is omitted since an appropriate VLAN ID is already set in the corresponding output port (step S007).

When such an entry is not found as a result of the confirmation ("No" in the step S003), the OFS 100 adds a set of the automatically set VLAN ID candidate and the output port specified by the entry that is the target of addition or updating by the FlowMod message to the VLAN setting management unit 107 as a new entry. Note that, since a plurality of ports can be associated with a single VLAN ID in the table managed by the VLAN setting management unit 107 of the present exemplary embodiment as shown in FIG. 3, the output port can be just added to an entry in which the same VLAN ID as the automatically set VLAN ID candidate is set if such an entry exists. After the new entry has been added or the output port has been added to the corresponding entry, the OFS 100 sets the VLAN ID for the corresponding output port as shown in the table.

Further, when an action that instructs adding a VLAN ID is not set in the entry that is the target of addition or updating by the FlowMod message ("No" in the step S001) or no VLAN ID is specified in the match fields ("No" in the step S005), VLAN automatic setting is not performed (the step S007).

Further, when entry addition or updating is performed in the table of the VLAN setting management unit 107 in step S004 of FIG. 4, it is preferred that the VLAN setting unit 105 notify the OFC 102 of the updated contents in the table of the VLAN setting management unit 107. For instance, a message that can be uniquely set by a vendor in the OpenFlow protocol can be used for this notification. In the present exemplary embodiment, this message for notifying the updated contents in the table will be referred to as "VLAN STATUS message."

Upon receiving the VLAN STATUS message, the OFC 102 recognizes that appropriate VLAN setting has been performed in conjunction with the FlowMod message, and updates the configuration information of a virtual network managed by the OFC 102.

Further, the OFC 102 may inspect whether or not the combination of the VLAN ID and the output port indicated in the received VLAN STATUS message is appropriate in the context of the virtual network configuration. When the combination of the VLAN ID and the output port is determined to be inappropriate as a result of the inspection, the OFC 102 may instruct the OFS 100 to restore the table of the VLAN setting management unit 107.

Next, an operation of the OFS 100 of the present exemplary embodiment will be described in detail using a concrete example.

"Case where an Action Includes the Addition of a VLAN ID"

Figure 5:
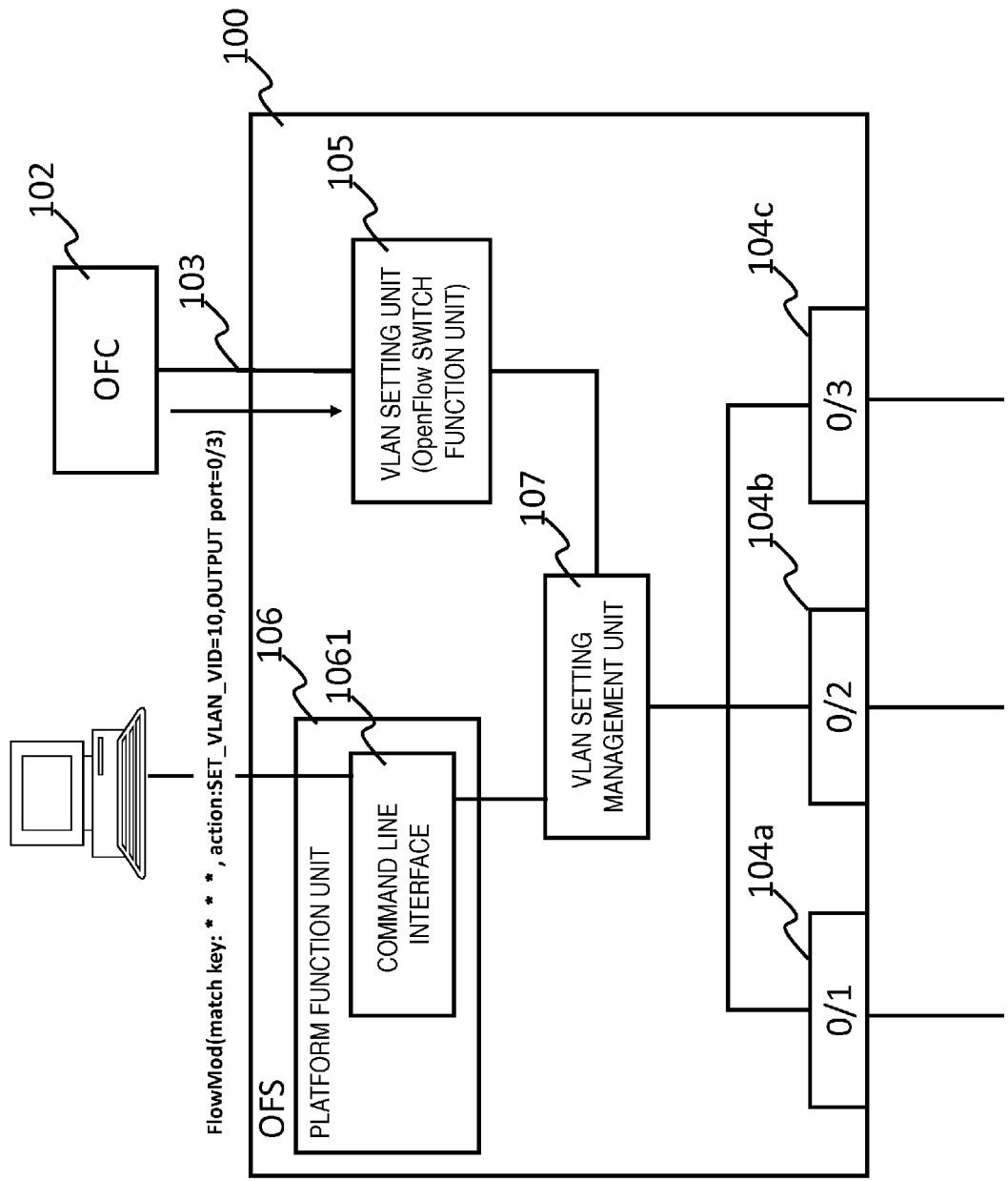
FIG. 5 is a drawing for explaining an operation of the switch apparatus of the first exemplary embodiment of the present invention (when a FlowMod message is received).

FIG. 5 shows a case where the OFS 100 receives from the OFC 102 an instruction to add or update an entry instructing, "when a packet matching a matching condition is received (match key: *), output the packet from the port "0/3" after adding a VLAN ID of "10" (action: SET_VLAN_VID=10, OUTPUT port=0/3)." In this case, since the addition of VLAN ID "10" and output from the port "0/3" are instructed as actions, the VLAN setting unit 105 makes VLAN ID "10" a candidate for an automatically set VLAN ID (the step S002 in FIG. 4). Then, the VLAN setting unit 105 refers to the table shown in FIG. 3 to confirm whether or not a set of VLAN ID "10" and the output port "0/3" has been registered already (the step S003 in FIG. 4). The set is determined not to be registered since the entry of "VLAN ID=10" in FIG. 3 has only the ports "0/1" and "0/2" registered. In this case, the VLAN setting unit 105 sets "VLAN ID=10" in the port "0/3" and adds the port "0/3" to the entry of "VLAN ID=10" in the table of the VLAN setting management unit 107, as shown in FIG. 6 (the step S004 in FIG. 4**).

Figure 6:
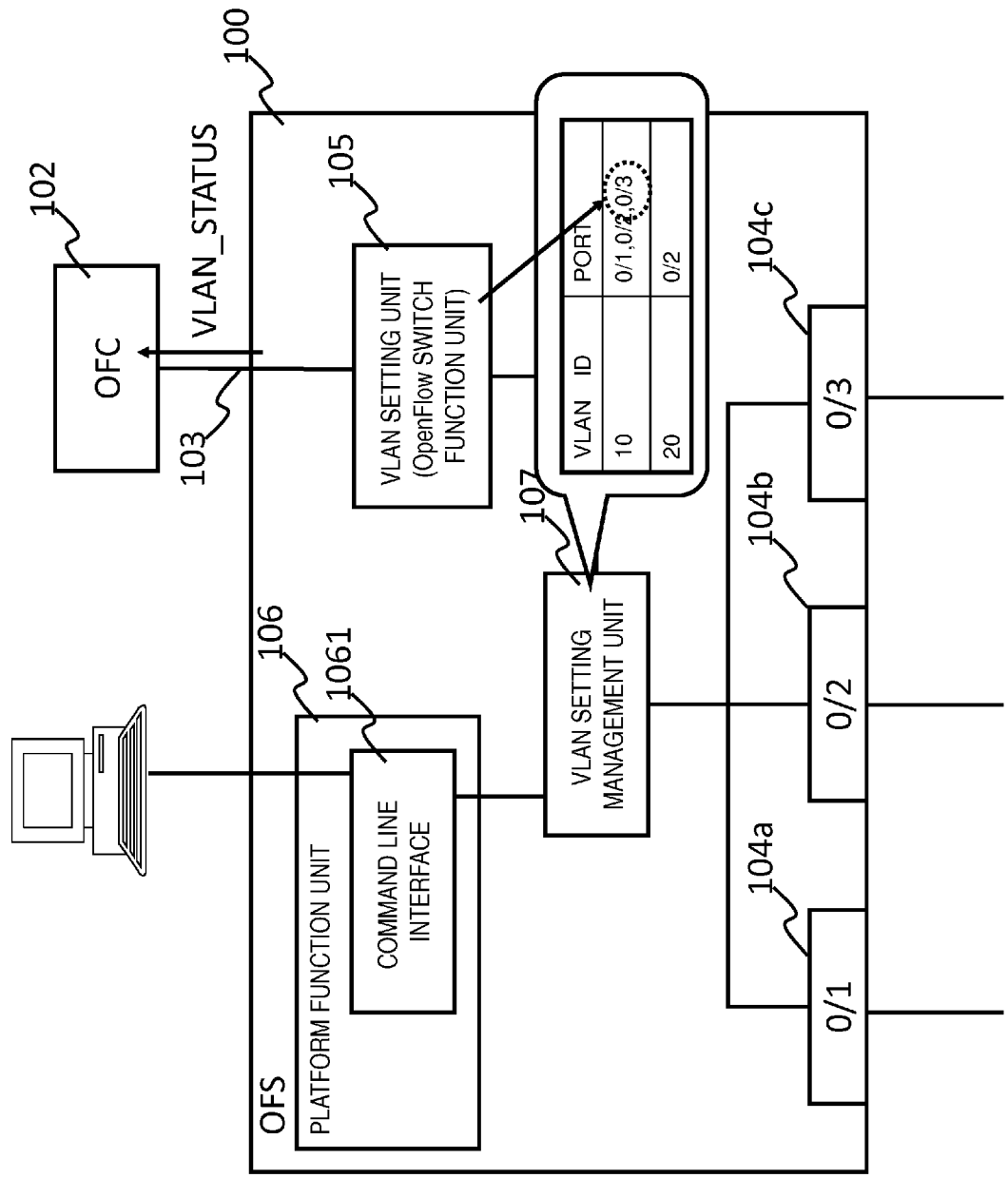
FIG. 6 is a drawing for explaining an operation of the switch apparatus of the first exemplary embodiment of the present invention (a table update and update content report).

Further, in the example in FIG. 6, the VLAN setting unit 105 notifies the OFC 102 that the port "0/3" has been added to the entry of "VLAN ID=10" using a VLAN_STATUS message.

"Case where a VLAN ID is Specified in a Matching"

Figure 7:
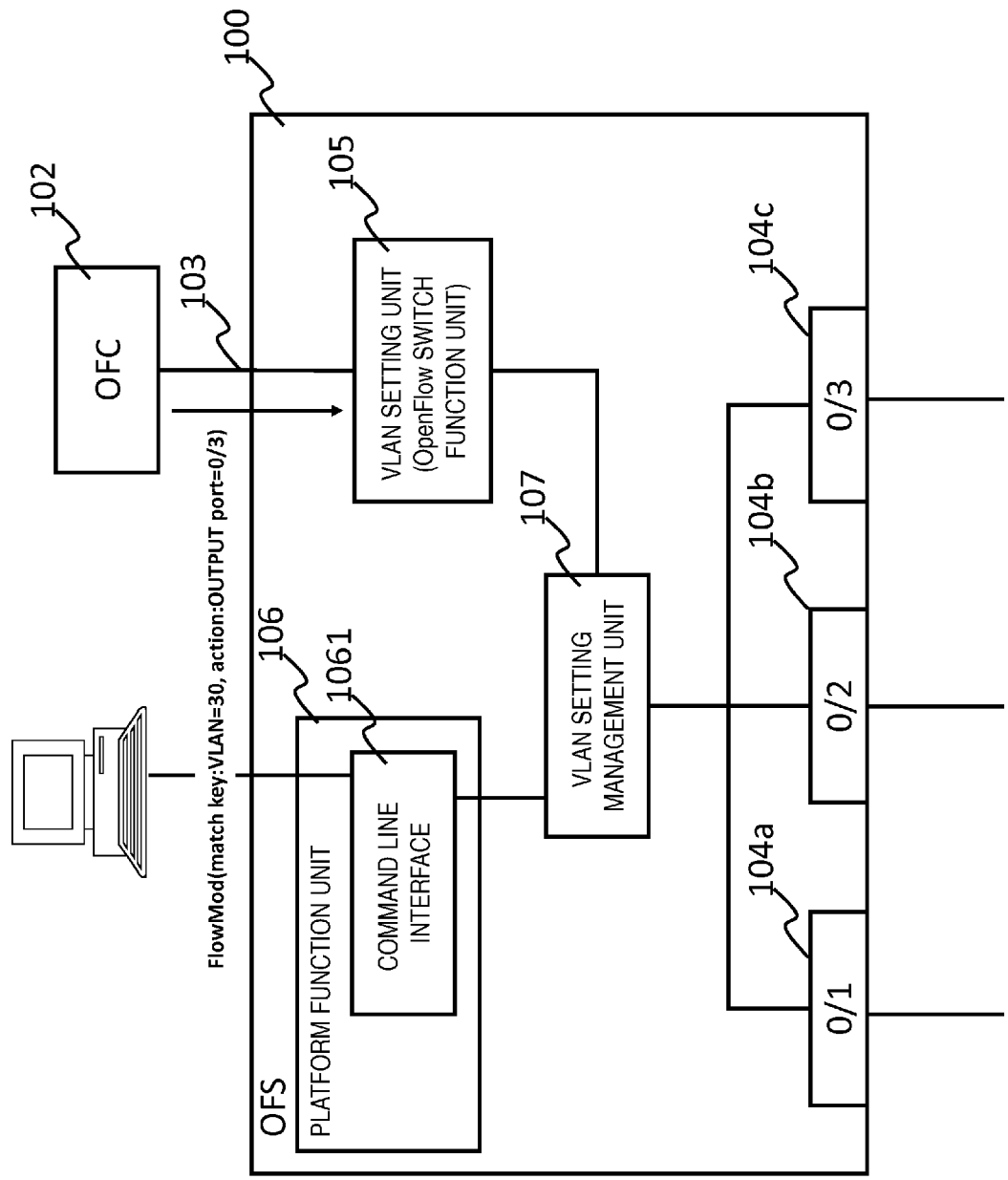
FIG. 7 is a drawing for explaining an operation of the switch apparatus of the first exemplary embodiment of the present invention (when a FlowMod message is received).

FIG. 7 shows a case where the OFS 100 receives from the OFC 102 an instruction to add or update an entry instructing, "when a packet matching a matching condition of "VLAN ID=30" is received (match key: VLAN ID=30), output the packet from the port "0/3" (action: OUTPUT port=0/3)." In this case, since VLAN ID "30" is specified as a matching condition and output from the port "0/3" are instructed, the VLAN setting unit 105 makes VLAN ID "30" a candidate for an automatically set VLAN ID (the step S006 in FIG. 4). Then, the VLAN setting unit 105 refers to the table shown in FIG. 3 to confirm whether or not a set of VLAN ID "30" and the output port "0/3" has been registered already (the step S003 in FIG. 4). The set is determined not to be registered since there is no entry of "VLAN ID=30" in FIG. 3. In this case, the VLAN setting unit 105 sets "VLAN ID=30" in the port "0/3" and adds an entry associating "VLAN ID=30" with the port "0/3" in the table of the VLAN setting management unit 107, as shown in FIG. 8 (the step S004 in FIG. 4).

Figure 8:
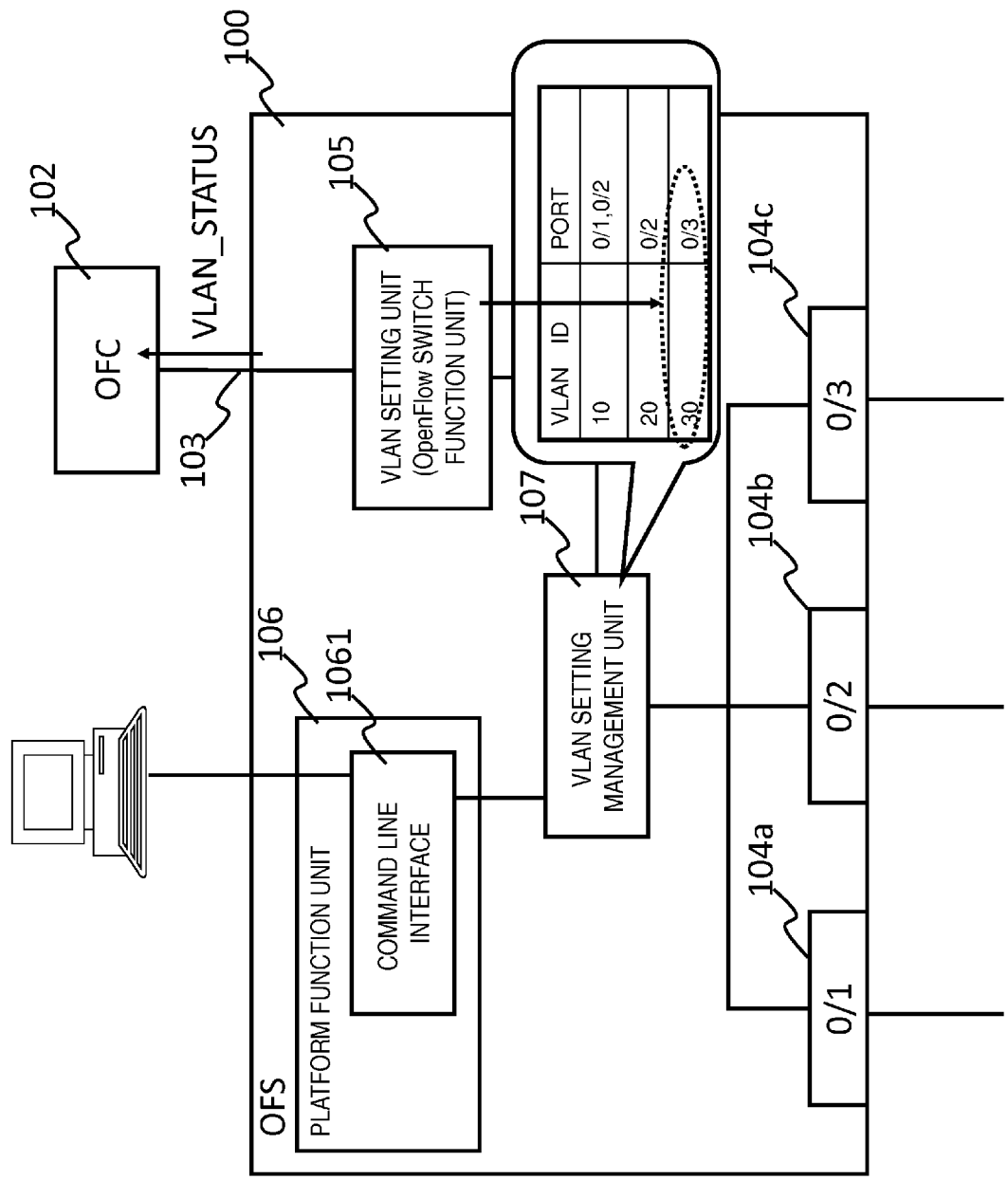
FIG. 8 is a drawing for explaining an operation of the switch apparatus of the first exemplary embodiment of the present invention (a table update and update content report).

Further, in the example of FIG. 8, the VLAN setting unit 105 notifies the OFC 102 that an entry associating "VLAN ID=30" with the port "0/3" has been added using a VLAN_STATUS message.

As described, according to the present exemplary embodiment, the OFS 100 extracts the relationship between a VLAN ID and an output port from a control message instructed by the OFC 102, and the VLAN ID is automatically set in the corresponding port if the relationship is not registered in the VLAN setting management unit 107.

An exemplary embodiment of the present invention has been described above, however, the present invention is not limited to the exemplary embodiment described and further modifications, substitutions, and adjustments can be added within the scope of the basic technological concept of the present invention. For instance, the number of ports and the VLAN information used in the exemplary embodiment described above are merely examples without being limited thereto.

Further, in the exemplary embodiment described above, a set of a VLAN ID and a port is transmitted to the OFC 102, however, a set of a VLAN ID and a port may be transmitted to another control apparatus operating together with the OFC 102.

Further, in the exemplary embodiment described above, a set of an VLAN ID and an output port is extracted from a FlowMod message, however, other control messages may be added as targets.

Further, in the exemplary embodiment described above, the VLAN setting unit 105 functions as the OpenFlow switch function unit as well, however, the two apparatuses can be separated. Further, for instance, a configuration in which the VLAN setting unit 105 and the VLAN setting management unit are integrated can be employed as well.

Finally, preferred modes of the present invention will be summarized.

(Mode 1)

Refer to the switch apparatus according to the first aspect.

(Mode 2)

In Mode 1, the VLAN setting unit may further notify the predetermined control apparatus of an added or updated content(s) of an entry in the VLAN setting management unit.

(Mode 3)

In Mode 1 or 2, the VLAN setting management unit holds an entry that includes an association between a VLAN ID and a port, and the VLAN setting unit, to instruct the VLAN setting management unit to set VLAN information specified in the control information in a corresponding output port, executes:

when there is an entry including a same VLAN information as VLAN information to be added to an output packet specified in the control information and the entry is not associated with a transmission port for the output packet, adding to the entry the transmission port for the output packet specified in the control information; and when there is no entry including a same VLAN information as VLAN information to be added to an output packet specified in the control information, adding an entry in which a transmission port for the output packet is associated with VLAN information included in the output packet.

(Mode 4)

In Mode 2 or 3, the VLAN setting unit may further hold a table that stores the control information received from the predetermined control apparatus and updates the table in accordance with an instruction from the predetermined control apparatus.

(Mode 5)

Refer to the VLAN setting method according to the second aspect.

(Mode 6)

Refer to the program according to the third aspect.

Note that Modes 5 and 6 can be developed into Modes 2 to 4 as Mode 1.

Further, the disclosure of each Patent Literature and each Non Patent Literature listed above is incorporated herein in its entirety by reference thereto. It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications aforementioned.

10: switch apparatus

20: control apparatus

100: OpenFlow switch (OFS)

102: OpenFlow controller (OFC)

103: secure channel

104, 104*a* to 104*c*: port

105: VLAN setting unit (OpenFlow switch function unit)

106: platform function unit

107: VLAN setting management unit

1061: command line interface (CLI)

What is claimed is:

1. A switch apparatus, comprising:
a plurality of ports;
a VLAN (Virtual Local Area Network) setting management unit that sets VLAN information in the plurality of ports and manages the VLAN information set in the plurality of ports; and
a VLAN setting unit that, when VLAN information to be added to an output packet specified in control information received from a predetermined control apparatus is not set in an output port for the output packet, instructs the VLAN setting management unit to set VLAN information specified in the control information in a corresponding output port,
wherein the VLAN setting management unit holds an entry that includes an association between a VLAN ID and a port, and wherein the VLAN setting unit, to instruct the VLAN setting management unit to set VLAN information specified in the control information in a corresponding output port, executes:
when there is an entry including a same VLAN-information as VLAN information to be added to an output packet specified in the control information and the entry is not associated with a transmission port for the output packet, adding to the entry the transmission port for the output packet specified in the control information; and when there is no entry including the same VLAN information as the VLAN information to be added to the output packet specified in the control information, adding an entry in which a transmission port for the output packet is associated with VLAN information included in the output packet.

2. The switch apparatus according to claim 1, wherein the VLAN setting unit further notifies the predetermined control apparatus of an added or updated content of an entry in the VLAN setting management unit.

3. The switch apparatus according to claim 2, wherein the VLAN setting unit further holds a table that stores the control information received from the predetermined control apparatus and updates the table in accordance with an instruction from the predetermined control apparatus.

4. The switch apparatus according to claim 1, wherein the predetermined control apparatus includes a control apparatus in a centralized-control-type network.

5. The switch apparatus according to claim 4, wherein the control apparatus comprises an OpenFlow controller.

6. The switch apparatus according to claim 1, wherein the predetermined control apparatus includes an OpenFlow controller.

7. The switch apparatus according to claim 1, wherein the VLAN setting management unit sets VLAN information in the plurality of ports and manages the VLAN information set in the plurality of ports based on an instruction from the VLAN setting unit.

8. A VLAN (Virtual Local Area Network) setting method, comprising:
by a switch apparatus comprising a plurality of ports, confirming whether or not VLAN information to be added to an output packet specified in control information received from a predetermined control apparatus is set by a VLAN setting management unit in an output port specified in the control information; and
setting, by a VLAN setting unit, in the output port the VLAN information to be added to the output packet specified in the control information received from the predetermined control apparatus when the VLAN information to be added to the output packet specified in the control information is not set in the output port,
wherein the VLAN setting management unit holds an entry that includes an association between a VLAN ID and a port, and
wherein the VLAN setting unit, to instruct the VLAN setting management unit to set VLAN information specified in the control information in a corresponding output port executes:
when there is an entry including a same VLAN information as VLAN information to be added to an output packet specified in the control information and the entry is not associated with a transmission port for the output packet, adding to the entry the transmission port for the output packet specified in the control information and when there is no entry including the same VLAN information as the VLAN information to be added to the output packet specified in the control information, adding an entry in which transmission port for the output packet is associated with VLAN information included in the output packet.

9. The VLAN setting method according to claim 8, wherein the predetermined control apparatus includes a control apparatus in a centralized-control-type network.

10. The VLAN setting method according to claim 9, wherein the control apparatus comprises an Open Flow controller.

11. The VLAN setting method according to claim 8, wherein the predetermined control apparatus includes an OpenFlow controller.

12. A non-transitory computer-readable recording medium storing a program that causes a computer, arranged in a switch apparatus that comprises a plurality of ports, to execute:
confirming whether or not VLAN (Virtual Local Area Network) information to be added to an output packet specified in control information received from a predetermined control apparatus is set by a VLAN setting management unit in an output port specified in the control information; and
setting, by a VLAN setting unit, in the output port the VLAN information to be added to the output packet specified in the control information received from the predetermined control apparatus when the VLAN information to be added to the output packet specified in the control information is not set in the output port,
wherein the VLAN setting management unit holds an entry that includes an association between a VLAN ID and a port, and
wherein the VLAN setting unit, to instruct the VLAN setting management unit to set VLAN information specified in the control information in a corresponding output port, executes:
when there is an entry including a same VLAN information as VLAN information to be added to an output packet specified in the control information and the entry is not associated with a transmission port for the output packet, adding to the entry the transmission port for the output packet specified in the control information: and
when there is no entry including the same VLAN information as the VLAN information to be added to the output packet specified in the control information, adding an entry in which a transmission port for the output packet is associated with VLAN information included in the output packet.

13. The non-transitory computer-readable recording medium according to claim 12, wherein the predetermined control apparatus includes a control apparatus in a centralized-control-type network.

14. The non-transitory computer-readable recording medium according to claim 13, wherein the control apparatus comprises an OpenFlow controller.

\* \* \* \* \*